Nov. 27, 1956  A. ZISKA  2,771,662
RING CUTTING MACHINE
Filed Aug. 20, 1954  3 Sheets-Sheet 1
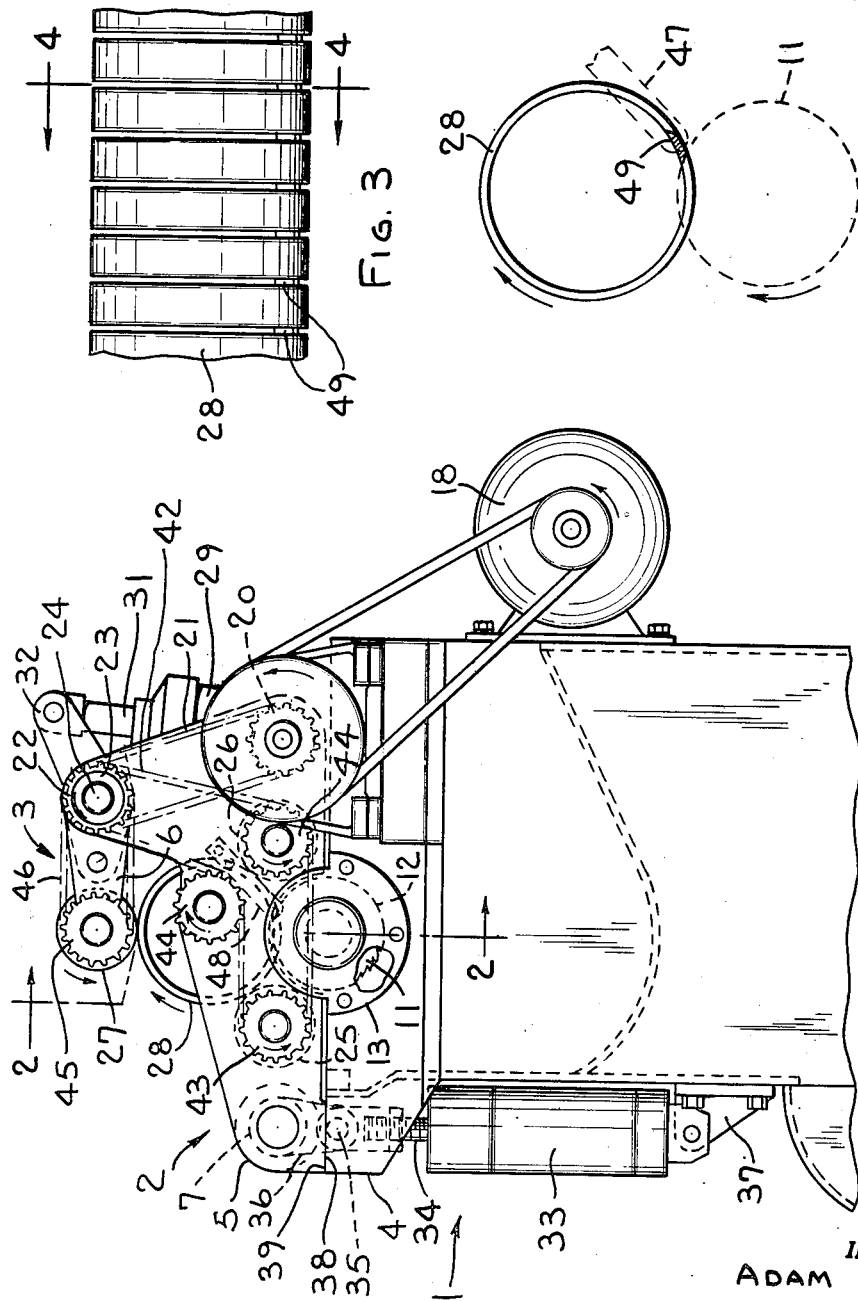
INVENTOR.
ADAM ZISKA
BY
Archer R. Woolfork
ATTORNEY

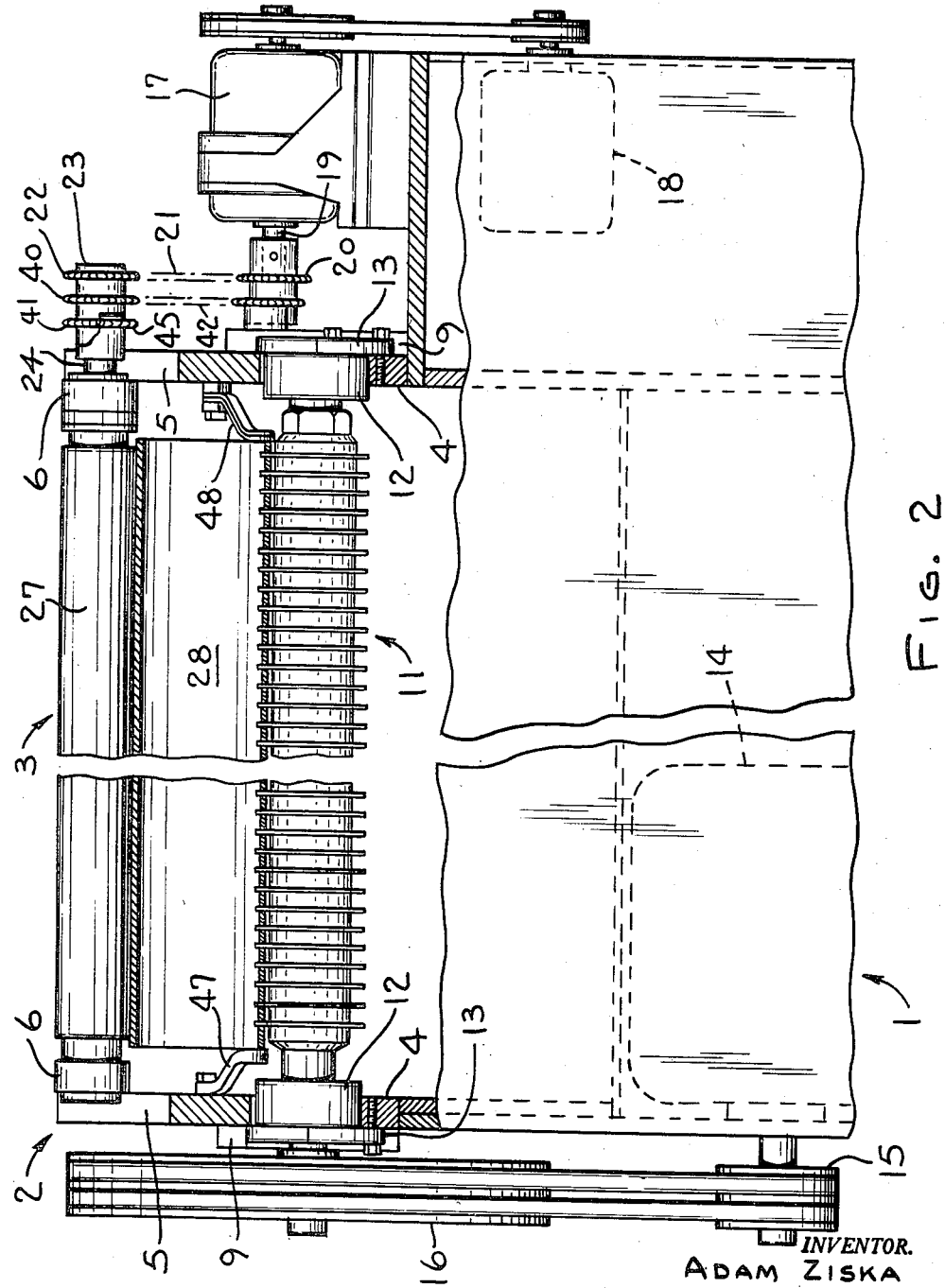

Nov. 27, 1956     A. ZISKA     2,771,662

RING CUTTING MACHINE

Filed Aug. 20, 1954     3 Sheets-Sheet 3

INVENTOR.
ADAM ZISKA
BY
Arthur R. Woolfolk
ATTORNEY

United States Patent Office 2,771,662
Patented Nov. 27, 1956

2,771,662

RING CUTTING MACHINE

Adam Ziska, Wauwatosa, Wis.

Application August 20, 1954, Serial No. 451,214

3 Claims. (Cl. 29—70)

This invention relates to a ring cutting machine and is particularly directed to a ring cutting machine which is designed to cut rings from an elongated tube.

Machines for cutting rings from tubes as heretofore manufactured frequently cut the rings individually one by one. It has been found that a great deal of time may be saved by cutting a plurality of rings simultaneously from the tube. In doing this, however, various difficulties have been encountered. One of the difficulties is that the rings as they are almost cut off from the tube tend to shift and tilt and thus produce irregularities in the finished product. Another difficulty has arisen from the fact that the prior machines usually use expanding mandrels which frequently give a great deal of trouble in this type of machine and also are relatively expensive constructions and materially reduce the total number of rings that may be cut per hour where the loading and unloading of the mandrel is required.

This invention is designed to overcome the above noted defects and objects of this invention are to provide a novel form of ring cutting machine which does not require an expanding mandrel but which is so made that the tube is firmly held between supporting and driving rollers in a securely clamped, firm manner although providing for free rotation of the tube.

Further objects are to provide a ring cutting machine which may be quickly loaded and unloaded, which will not allow axial or other shifting of the rings even at the final portion of the cutting operation but which will hold the rings in a correct manner throughout the entire cutting operation although providing for the simultaneous cutting of a plurality of rings from the tube.

Further objects are to provide a ring cutting machine which is so made that it is a very simple matter to remove the gang saws so as to enable the operator to replace or sharpen the saws as required.

Further objects are to provide a ring cutting machine which has very few parts and may be cheaply manufactured and which is very rapid in its operation and will provide for the cutting of a large number of rings per hour from a single tube.

An embodiment of the invention is shown in the accompanying drawings in which:

Figure 1 is an end view partly broken away.

Figure 2 is a front view of the machine with parts broken away and parts in section, the section being approximately a line section and taken on the line 2—2 of Figure 1.

Figure 3 is a fragmentary view of the tube from which the rings are cut, such view being drawn to an enlarged scale and showing the rings partly cut from the tube.

Figure 4 is a sectional view on the line 4—4 of Figure 3 showing the saw and one of the end guides in dotted lines.

Figure 5:
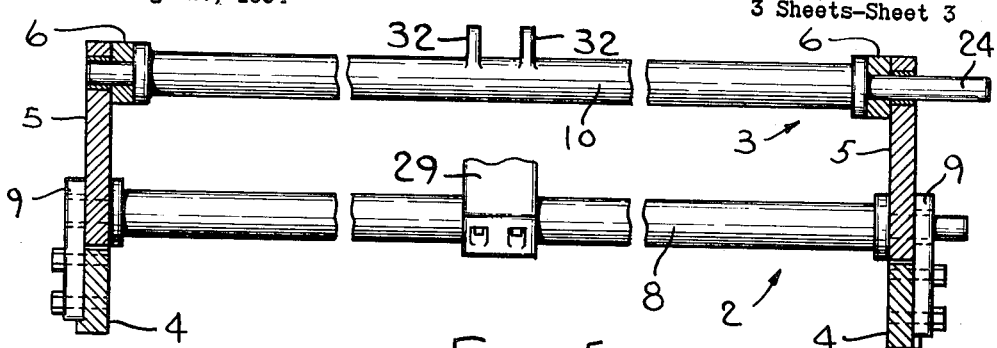
Figure 5 is a sectional view on the line 5—5 of Figure 7, with parts broken away.
Figure 6:
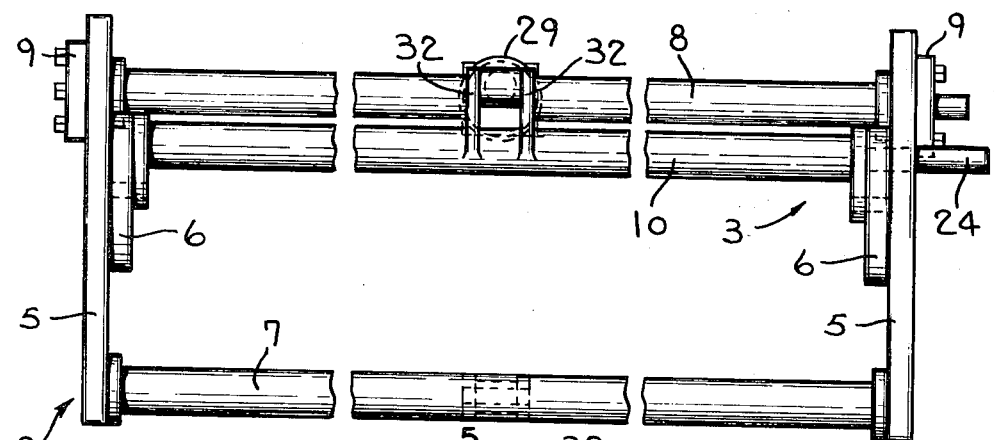
Figure 6 is a top plan view of the rocking head with the rollers and other portions of the machine omitted.

Referring to the drawings it will be seen that the machine comprises a body portion 1 and a main rocking head or frame indicated generally by the reference character 2 which latter carries a clamping head or frame indicated generally by the reference character 3. The body portion 1 is provided with end plates or frame members 4 and the main rocking frame 2 is provided with end plates or head plates 5. The clamping frame is provided with rocking, clamping arms 6 pivotally supported from the rocking end plates 5 of the main rocking head or frame 2.

The main rocking head or frame indicated generally by the reference character 2 has at its outer end a rigidly mounted spacer or bracing rod or member 7 and at its inner end a rigidly mounted spacer or bracing rod 8. The spacer or bracing rod 8 has reduced ends which are pivotally mounted in brackets 9 rigidly carried by the end plates or frame members 4 of the body portion 1. The clamping rocking arms 6 of the clamping frame 3 are rigidly joined to each other by means of a rockshaft 10 which is pivotally mounted in the end plates 5 of the main rocking frame 2 as shown most clearly in Figure 5.

A gang saw assembly indicated generally by the reference character 11 is revolubly supported by removable bearings 12 whose flanges 13 are bolted to the end plates 4 of the main body portion 1 as shown in Figures 1 and 2.

The gang saw assembly 11 is driven from a relatively larger motor 14 or from any other suitable source of power. For example, the motor 14 may be provided with a relatively small pulley 15 which is belted by means of V-belts to a relatively large pulley 16 directly carried by the gang saw assembly.

On the other side of the machine from that occupied by the driving pulley 16 for the gang saws a speed reduction mechanism or speed reducer 17 is mounted and is connected in any suitable manner as by means of pulleys and belts to a relatively smaller motor 18. The reduced speed shaft 19 of the speed reducer is provided with a sprocket wheel 20 which is connected by means of a chain 21 with the outer sprocket wheel 22 carried by a sleeve 23 which latter is loosely revolubly mounted on a reduced extension 24 of the rockshaft or rod 10 which also constitutes a spacer rod for the rocking, clamping levers 6, see Figures 2 and 5, to which it is rigidly connected.

The rocking head or main head 2 carries three driving rollers indicated by the reference characters 25, 26 and 27. The roller 27 is in reality carried by the clamping arms 6, as may be seen from Figures 1 and 7. The main head 2 as stated is pivotally carried or supported from the brackets 9 and its pivotal axis is the axis of the bracing rod 8. From an examination of Figures 1 and 7 it will be seen that the rollers 25 and 26, are respectively, the front roller and the rear roller and the roller 27 is the clamping roller. These rollers are preferably knurled so as to secure the proper grip on the tube 28 from which the rings are cut.

The bracing rod 8 also pivotally carries a hydraulic member such as the cylinder 29 within which a piston 30 is mounted. The piston rod 31 is connected to a pair of rock arms 32, see Figures 1, 5, 6 and 7, which are rigid with the rockshaft 10. It is thus apparent that the clamping roller 27 may be moved into or out of engagement with the tube 28 by means of the piston 30.

The entire head 2 may be rocked about the spacing rod 8 by means of a hydraulic feed member such as a hydraulic cylinder 33 and piston, not shown. The piston rod 34 is pivotally connected by means of a pin 35 with a pair of ears 36 rigid with the front spacing rod 7 which rigidly joins the heads 5 of the main head assembly 2. It is thus apparent that the head 2 may be rocked about the axis of the spacing rod 8 to raise or lower the tube 28 with reference to the gang saws 11. The cylinder 33 is pivotally mounted upon a bracket 37 carried by the main body of the machine indicated generally by the reference character 1.

Figure 7:
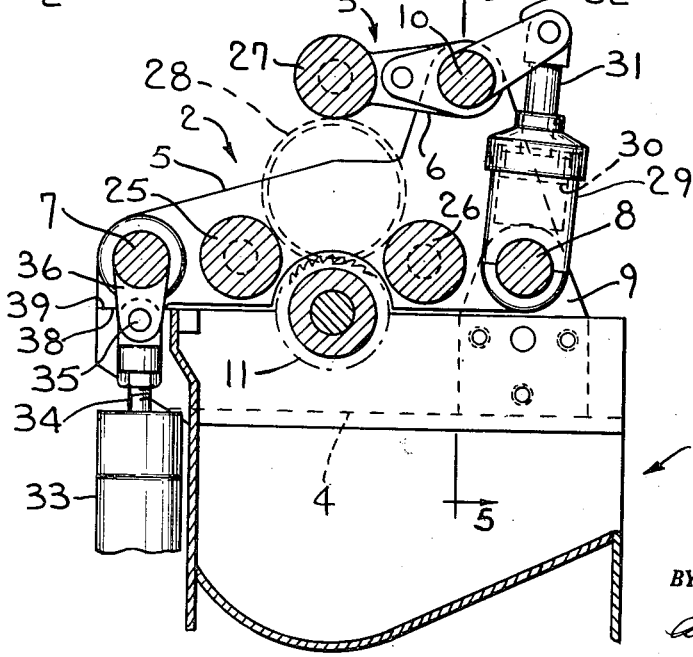
Figure 7 is a vertical sectional view through the machine.

It is to be noted that the end plates 5 of the main head and the end plates or frame members 4 and 5 of the body portion have contacting surfaces or lips indicated respectively by the reference characters 38 and 39 which thus limit the downward rocking motion of the main head 2, see Figures 1 and 7.

The three rollers are driven from the motor 17 as may be seen from reference to Figures 1 and 2. The sleeve 23, see Figure 2, carries a pair of sprocket wheels 40 and 41. The sprocket wheel 40 is operatively connected by means of a chain 42 with the sprocket wheels 43 and 44 of the front and rear rollers 25 and 26, respectively. The sprocket wheel 41 is operatively connected to the sprocket wheel 45 of the clamping roller 27 by means of a chain 46. It will be seen that the main head assembly 2 may be rocked upwardly or downwardly with reference to the gang saws and the clamping roller and clamping arms 27 and 6, respectively, may be rocked upwardly or downwardly with reference to the tube 28 without interfering in any manner with the chain drive.

In operation, assuming that the main head 2 is in its uppermost position and the clamping roller 27 is in its uppermost position, the tube 28 is placed upon the front and rear rollers 25 and 26, see Figures 1 and 7. Thereafter, the clamping roller 27 is rocked downwardly into engagement with the tube. The gang saws are started and are rapidly rotated by the large motor 14, see Figure 2, and the main head 2 is rocked downwardly so that the tube 28 is fed downwardly into contact with the gang saws 11. This downward motion of the main head continues in a gradual manner until the lips 38 and 39 contact, and thus limits further downward motion. It is to be understood that the hydraulic feeding means controling the downward rocking of the main head 2 is accomplished by what is known as a "hydraulic lock system," that is to say, the hydraulic pressure causing downward motion is balanced against a predetermined pressure so that a gradual downward feeding of the main head 2 is provided. After the saws have cut completely through the tube 28, the motor 18 is started and the feed rollers or driving rollers 25, 26 and 27 are slowly rotated to cause rotation of the tube 28 and to thus cause the cutting of the tube all the way around into the many rings as indicated in Figure 3. If desired guide members 47 and 48, see Figure 2, may be provided at opposite ends of the tube 28. One of these guiding members, for example, the member 48, is yielding and provides a yielding pressure against the adjacent end of the tube thus holding the tube in contact with the guiding member 47. The position of these guiding members is such that the pressure is transmitted directly in line with the last portion of the tube 28 which is cut by the gang saws 11 as may be seen particularly from Figures 3 and 4. The reason for this is to prevent relative rocking of the severed portions of the rings cut from the tube 28. In other words the pressure transmitted to the tube by the clamping of the tube by the guiding members 47 and 48 is in direct alignment with the last portion of the tube which is cut by the saws. This last portion of the tube which is cut by the saws is indicated by the reference character 49, in Figures 3 and 4. If desired the guiding members 47 and 48 may be dispensed with wherever they are not needed.

After the rings have been cut the clamping roller 27 is raised and the rings are lifted out of the machine by a suitable tool, not shown. For example, an elongated rod may be passed through all of the rings and the rings may be simultaneously lifted from the machine.

If it is desired to remove the gang saws all that is necessary is to remove the pin 35, see Figures 1 and 7 and rock the main head 2 upwardly and backwardly, thereafter the bearings 12 are detached from the main frame end members 4, see Figures 1 and 2 and the gang saws and bearings are lifted as a unitary structure from the machine.

It will be seen that a very simple and serviceable type of ring cutting machine has been provided in which means are furnished for feeding the tube downwardly into engagement with the gang saws so that the gang saws cut completely through the tube at one point. It will also be seen that the feed rollers and associated mechanism constitute means for driving or rotating the tube so that a plurality of rings are simultaneously cut from the tube.

In actual operation it has been found that the machine is very rapid in its operation and also it has been found that the removal of the cut rings and the placing of a new tube in the machine may be accomplished with the minimum effort on the part of the operator.

Although this invention has been described in considerable detail, it is to be understood that such description is intended as illustrative rather than limiting, as the invention may be variously embodied and is to be interpreted as claimed.

I claim:

1. A ring cutting machine for simultaneously cutting a plurality of rings from a tube comprising a plurality of circular saws rigidly clamped together, all of said circular saws being of the same diameter, power means for rotating said saws, a plurality of rollers for supporting said tube and for clamping said tube between said rollers, clamping means for moving said rollers relatively to each other to clamp the tube in place and for moving the rollers relatively to each other to release the rings after they have been cut from the tube, a pair of pivotally mounted spaced heads revolubly supporting said rollers and supporting said clamping means, said heads, rollers, clamping means and tube constituting a unitary assembly with the tube clamped in place and said assembly being rockable as a unitary structure with the tube clamped in place, feeding means for rocking the assembly consisting of the heads, rollers, clamping means and tube, towards said saws until said saws have cut completely through said tube, and power means for rotating said rollers to thereby rotate said tube whereby a plurality of rings are simultaneously cut from said tube.

2. A ring cutting machine for simultaneously cutting a plurality of rings from a tube comprising a plurality of circular saws rigidly clamped together, all of said circular saws being of the same diameter, power means for rotating said saws, a plurality of rollers for supporting said tube and for clamping said tube between said rollers, clamping means for causing relative motion of translation of said rollers to thereby clamp said tube between said rollers, a pair of spaced heads revolubly supporting said rollers, feeding means for producing relative movement of the assembly consisting of heads, rollers, and tube, and said saws until said saws have cut completely through said tube, power means for rotating said rollers to cause said tube to execute one complete revolution to thereby cause said saws to simultaneously cut a plurality of rings from said tube, and a pair of guiding means for engaging opposite ends of said tube to prevent axial shifting of said tube, one of said guiding means being yieldingly pressed against said tube, said guiding means being positioned in line with the last portion of the tube to be cut to thereby prevent tilting of the rings during the final portion of the cutting operation.

3. A ring cutting machine for simultaneously cutting a plurality of rings from a tube comprising a body portion, a plurality of circular saws rigidly clamped together, all of said circular saws being of the same diameter, removable bearings for said saws, power means for rotating said saws, a plurality of rollers for supporting said tube and for clamping said tube between said rollers, clamping means for causing relative motion of translation of said rollers to thereby clamp said tube between said rollers, a pair of spaced heads revolubly supporting said rollers, feeding means for producing relative movement between the assembly consisting of heads, rollers and tube, and said saws until said saws have cut completely through said tube, connecting means for detachably connecting said feeding means and said assembly, said heads being pivotally mounted on said body portion and being rockable upwardly when said assembly is disconnected from said feeding means to thereby allow removal of said saws, and power means for rotating said rollers to cause said tube to execute one complete revolution to thereby cause said saws to simultaneously cut a plurality of rings from said tube.

References Cited in the file of this patent

UNITED STATES PATENTS

| | | |
|---|---|---|
| 1,890,854 | Hutchinson | Dec. 13, 1932 |
| 1,908,695 | Deutsch | May 16, 1933 |
| 2,356,038 | Edwards | Aug. 15, 1944 |
| 2,580,279 | Briglia | Dec. 25, 1951 |
| 2,619,176 | Pearson | Nov. 25, 1952 |